(12) United States Patent
Ruditsky et al.

(10) Patent No.: US 11,695,986 B2
(45) Date of Patent: *Jul. 4, 2023

(54) PRE-FETCHING OF INFORMATION TO FACILITATE CHANNEL SWITCHING

(71) Applicant: AT&T Intellectual Property I, L.P., Atlanta, GA (US)

(72) Inventors: Alexander Ruditsky, Fair Lawn, NJ (US); Eric Zavesky, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/836,676

(22) Filed: Jun. 9, 2022

(65) Prior Publication Data

US 2022/0303614 A1   Sep. 22, 2022

Related U.S. Application Data

(63) Continuation of application No. 16/586,520, filed on Sep. 27, 2019, now Pat. No. 11,388,471.

(51) Int. Cl.
*H04N 21/438* (2011.01)
*H04N 21/4402* (2011.01)
(Continued)

(52) U.S. Cl.
CPC ..... *H04N 21/4383* (2013.01); *H04N 21/4402* (2013.01); *H04N 21/4627* (2013.01); *H04N 21/4662* (2013.01); *H04N 21/83* (2013.01)

(58) Field of Classification Search
None
See application file for complete search history.

(56) References Cited

U.S. PATENT DOCUMENTS 6,128,652 A   10/2000   Toh et al.
7,788,698 B2   8/2010   Fang
(Continued)

FOREIGN PATENT DOCUMENTS

WO   9859315 A1   12/1998
WO   2014194295 A1   12/2014
(Continued)

OTHER PUBLICATIONS

Desaulniers, Nick, "Streaming media on demand with Media Source Extensions", moz://a HACKS, hacks.mozilla.org, Jul. 1, 2015.
(Continued)

*Primary Examiner* — Junior O Mendoza
(74) *Attorney, Agent, or Firm* — Guntin & Gust, PLC; Miyoung Shin

(57) ABSTRACT

Aspects of the subject disclosure may include, for example, receiving, for a selected channel, a first video; processing the first video for rendering on a display being viewed by a user; selecting from among a plurality of channels a subset of channels for which to pre-fetch data, the selecting being according to predictions that each channel of the subset of channels is more likely to be requested by the user than each channel of the plurality of channels that is not part of the subset; prioritizing the subset of channels such that a first channel of the subset of channels has a priority over a second channel of the subset of channels, the first channel being given the priority based upon a prediction that the first channel is more likely to be requested by the user than the second channel; pre-fetching, for the first channel, first data of a first type and second data of a second type; and pre-fetching, for the second channel, third data of the first type without pre-fetching any data of the second type. Other embodiments are disclosed.

20 Claims, 9 Drawing Sheets

(51) Int. Cl.
    *H04N 21/4627*      (2011.01)
    *H04N 21/466*      (2011.01)
    *H04N 21/83*      (2011.01)

(56) References Cited

U.S. PATENT DOCUMENTS

| | | | |
|---|---|---|---|
| 8,194,859 | B2 | 6/2012 | Wingert et al. |
| 8,539,237 | B2 | 9/2013 | Butterworth et al. |
| 8,635,355 | B2 | 1/2014 | Harris et al. |
| 8,762,523 | B2 | 6/2014 | Damola |
| 9,071,798 | B2 | 6/2015 | Hoffert et al. |
| 9,270,479 | B2 | 2/2016 | Yasukawa et al. |
| 9,420,351 | B2 | 8/2016 | Wen et al. |
| 9,444,856 | B2 | 9/2016 | Phillips et al. |
| 9,510,058 | B2 | 11/2016 | Gossweiler, III et al. |
| 9,804,668 | B2 | 10/2017 | Thorwirth et al. |
| 10,069,884 | B2 | 9/2018 | Gaunt et al. |
| 10,237,589 | B2 | 3/2019 | Nair et al. |
| 11,388,471 | B2 * | 7/2022 | Ruditsky ............ H04N 21/4627 |
| 2012/0151539 | A1 * | 6/2012 | Funge ................ H04L 65/61 |
| | | | 725/109 |
| 2014/0280781 | A1 * | 9/2014 | Gregotski ........ H04N 21/23439 |
| | | | 709/219 |
| 2015/0089073 | A1 | 3/2015 | Phillips et al. |
| 2016/0182466 | A1 | 6/2016 | Wagenaar et al. |
| 2017/0230708 | A1 * | 8/2017 | Phillips ............. H04N 21/8456 |
| 2017/0353523 | A1 | 12/2017 | Mimar et al. |
| 2018/0129273 | A1 * | 5/2018 | Thorwirth ............ H04L 65/612 |
| 2018/0276130 | A1 * | 9/2018 | Choi ...................... G06F 9/383 |
| 2018/0343479 | A1 | 11/2018 | Gibson |
| 2018/0352049 | A1 | 12/2018 | Jeong et al. |
| 2019/0007728 | A1 | 1/2019 | Rasool |
| 2021/0044850 | A1 * | 2/2021 | Gala ...................... G06F 21/10 |
| 2021/0099752 | A1 | 4/2021 | Ruditsky et al. |

FOREIGN PATENT DOCUMENTS

| | | |
|---|---|---|
| WO | 2017007376 A1 | 1/2017 |
| WO | 2019011430 A1 | 1/2019 |

OTHER PUBLICATIONS

Mandal, Suman K., "Intelligent Pre-fetching to Reduce Channel Switching Delay in IPTV Systems", Dept. of Comp. Sci., Texas A & M University, tech. rep, 2008.

* cited by examiner

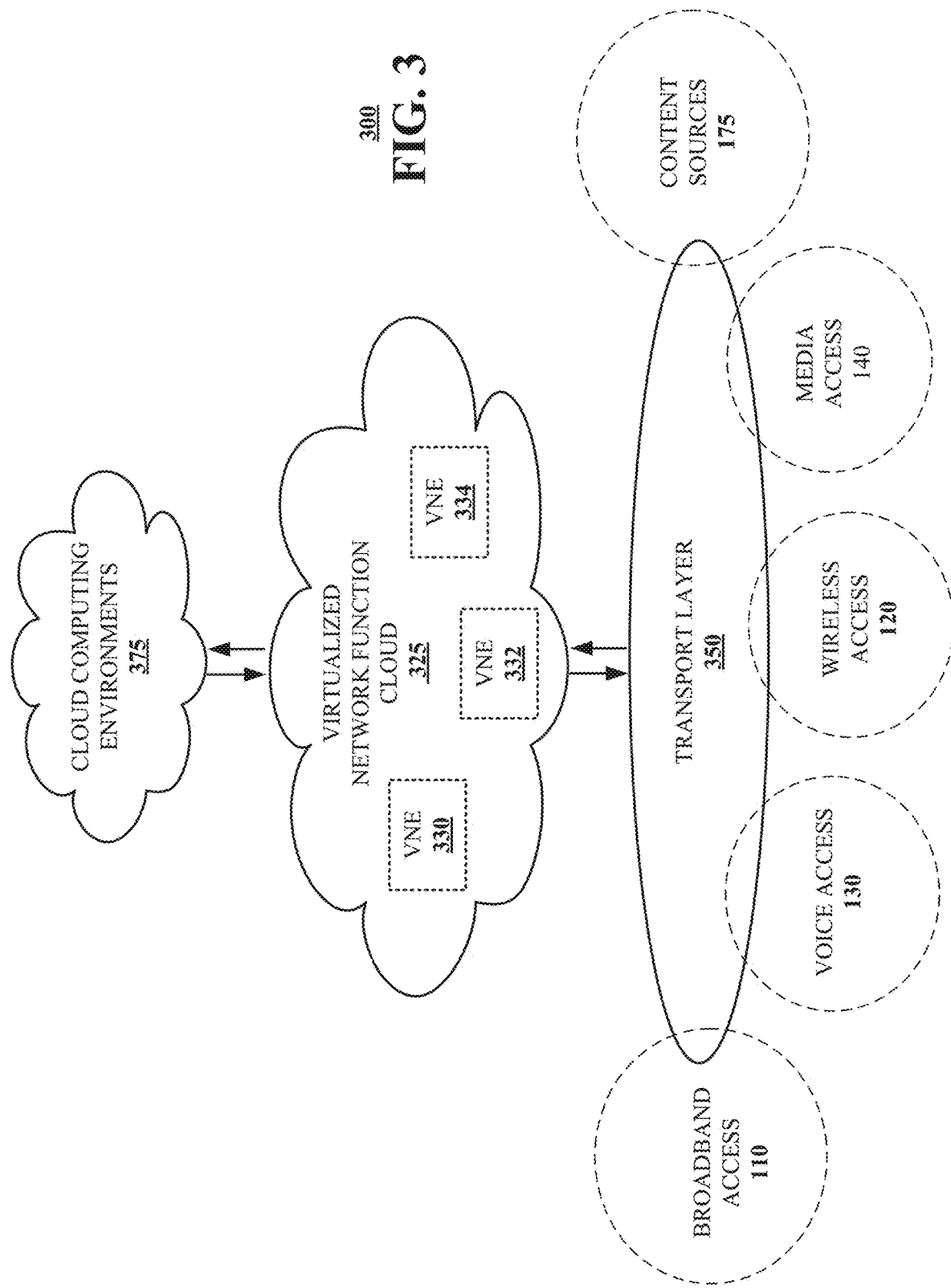

PRE-FETCHING OF INFORMATION TO FACILITATE CHANNEL SWITCHING

CROSS REFERENCE TO RELATED APPLICATION(S)

This application is a continuation of U.S. patent application Ser. No. 16/586,520, filed on Sep. 27, 2019. All sections of the aforementioned application(s) and/or patent(s) are incorporated herein by reference in their entirety.

FIELD OF THE DISCLOSURE

The subject disclosure relates to pre-fetching of information to facilitate channel switching.

BACKGROUND

A conventional streaming media approach is to implement a streaming media player as a single component which both accesses network resources and renders the media. In such a case, a switching between two media streams can require shutting down the current media player, instantiating a new one, and acquiring the new stream metadata, new DRM license and new media. In addition, this can involve shutting down and reestablishing rendering mechanisms on a device. Further, various conventional processes may take a significant amount of time.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for pre-fetching of information to facilitate channel switching. Other embodiments are described in the subject disclosure.

As described herein, one or more embodiments provide for determining (or predicting): (a) for which channels to pre-fetch information; and/or (b) when the information should be pre-fetched for one or more channels.

As described herein, one or more embodiments provide a streaming media player which uses different software components and/or different firmware components and/or different hardware components to separate functions for fetching the media content (e.g., video), for rendering the fetched media content (e.g., video) and/or for pre-fetching information associated with a plurality of channels that are predicted to be desired (or requested) by a viewer. In one specific example, the information that is pre-fetched is initialization data, manifest data and/or digital rights management (DRM) data.

Figure 1:
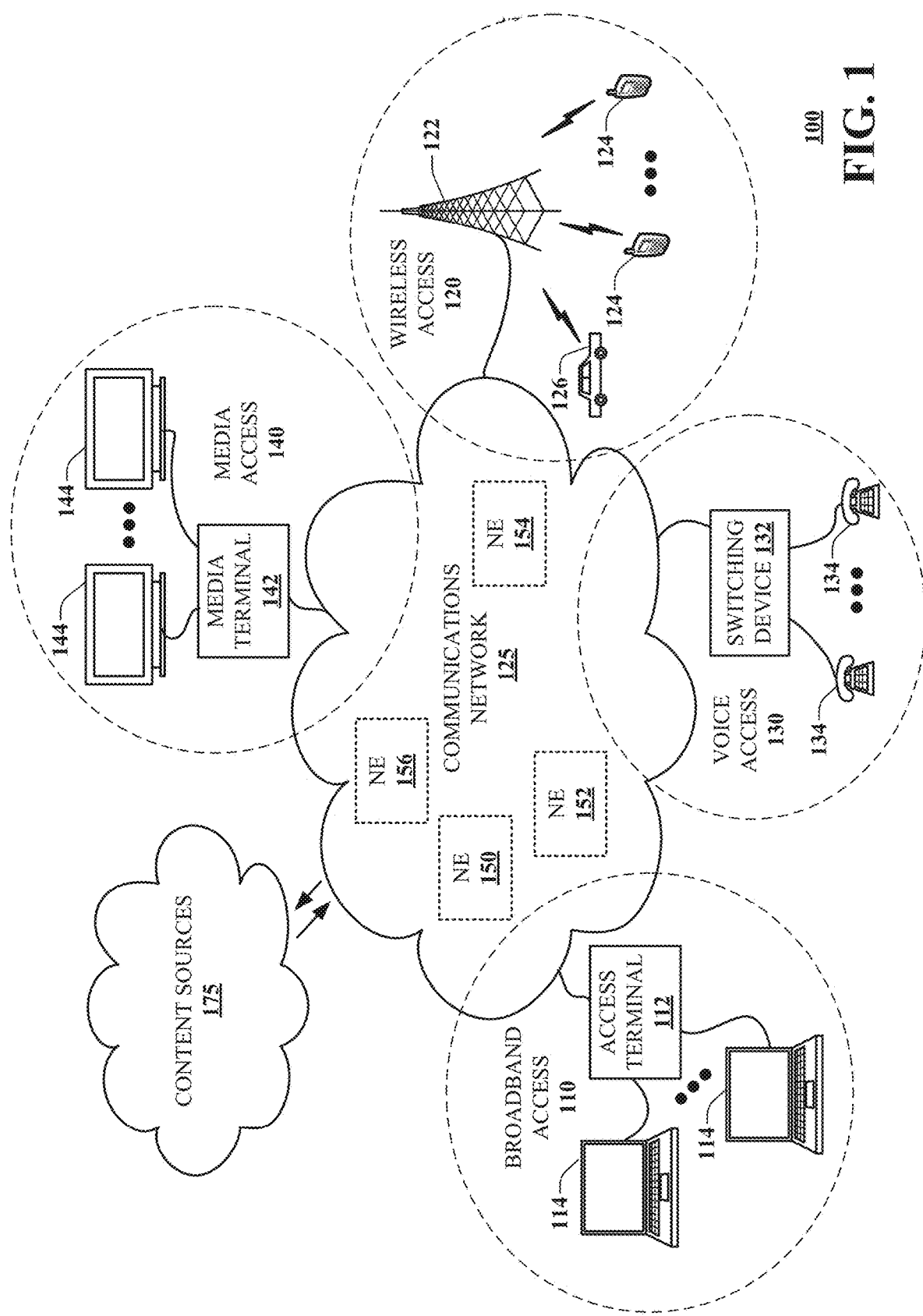
FIG. 1 is a block diagram illustrating an example, non-limiting embodiment of a communication network in accordance with various aspects described herein.

Referring now to FIG. 1, a block diagram is shown illustrating an example, non-limiting embodiment of a communication network 100 in accordance with various aspects described herein. For example, communication network 100 can facilitate in whole or in part determining (or predicting): (a) for which channels to pre-fetch information; and/or (b) when the information should be pre-fetched for one or more channels. Further communication network 100 can facilitate in whole or in part pre-fetching of such information. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
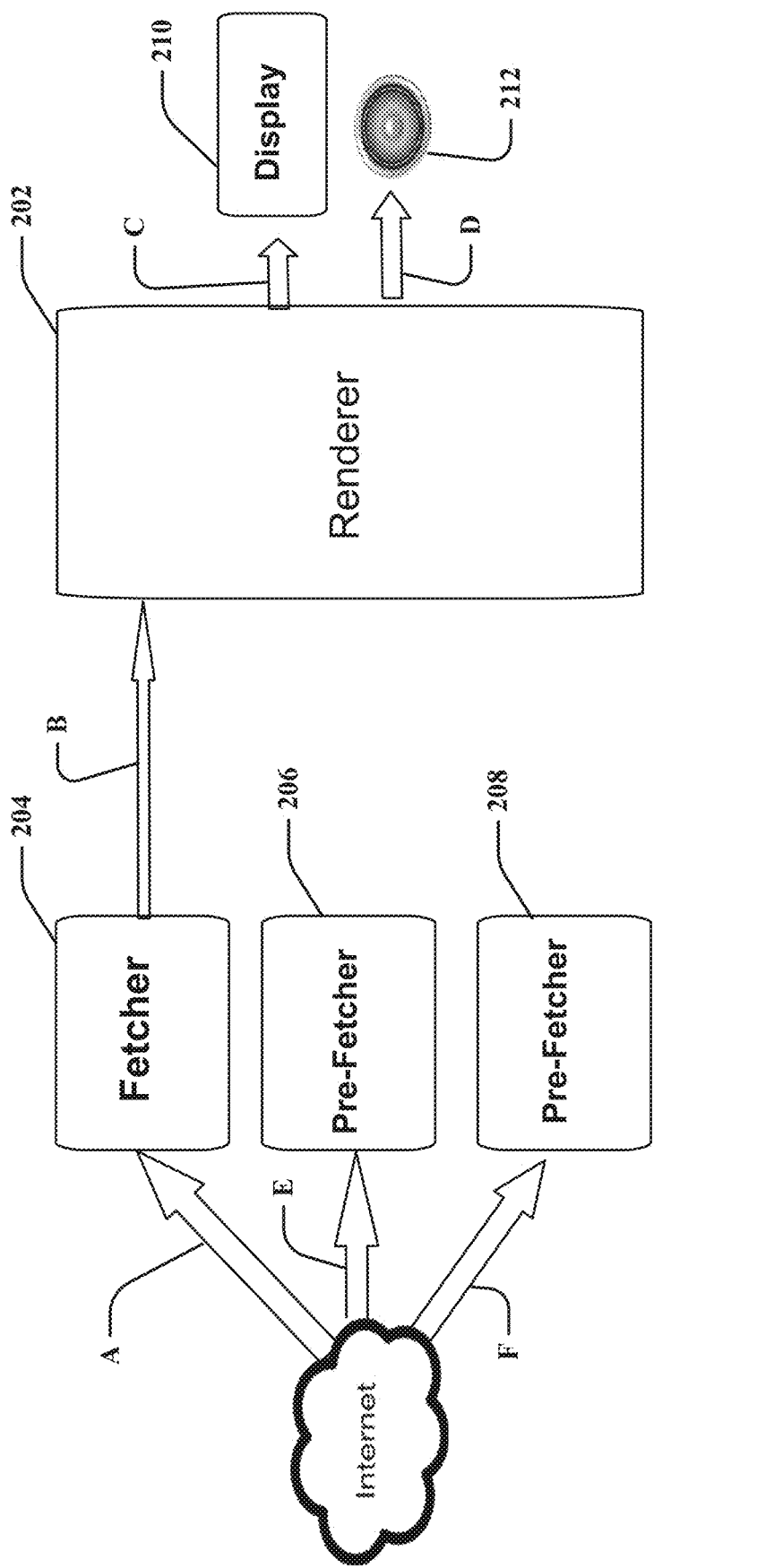
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communication network of FIG. 1 in accordance with various aspects described herein.

As seen in this FIG. 2A, system 200 includes renderer 202, fetcher 204, display 210, speaker 212, pre-fetcher 206 and pre-fetcher 208. In operation, fetcher 204 obtains media content (e.g., including video content and audio content) from the Internet (see communication path "A"). The media content can be obtained from one or more servers. The media content is sent from fetcher 204 to renderer 202 (see communication path "B"). Renderer 202 renders the media content and delivers the rendered media content to the display 210 via communication path "C" and to the speaker 212 via communication path "D". In addition, fetcher 204 obtains from the Internet (and then sends to renderer 202) any required ancillary information such as, for example, stream metadata, initialization data, manifest data and/or digital rights management (DRM) data (e.g., one or more licenses, one or more permissions). In one example, the ancillary information that is sent to the renderer 202 can be a sub-set of information that is obtained by the fetcher 204 from the Internet. In one specific example, information that is obtained by the fetcher 204 from the Internet (and that is not in turn sent by the fetcher 204 to the renderer 202) can be used by the fetcher 204 to calculate what to fetch next). In another example, the ancillary information can be obtained from one or more servers. In another example, the fetcher 204 can obtain the ancillary information from a network other than (or in combination with) the Internet.

Still referring to FIG. 2A, pre-fetcher 206 operates (e.g., independently of fetcher 204, independently of pre-fetcher 208 and independently of renderer 202) to obtain information from the Internet (see communication path "E"). The information can be obtained from one or more servers. The information obtained by pre-fetcher 206 can include information such as, for example, stream metadata, initialization data, manifest data and/or DRM data (e.g., one or more licenses, one or more permissions). The information obtained by pre-fetcher 206 can be used to facilitate a quick channel change to another channel (that is, a channel that is different from the one currently being rendered by renderer 202). The information obtained by pre-fetcher 206 can be sent (via a communication path not shown in this figure) to the renderer 202 upon a request by a user for the channel change to the channel associated with the information being obtained by the pre-fetcher 206. The information obtained by the pre-fetcher 206 can be associated with a channel that is determined (or predicted) as described herein. In another example, the pre-fetcher 206 can obtain information from a network other than (or in combination with) the Internet. After the channel change, the pre-fetcher 206 can act essentially as a fetcher. In one example, after the channel change (wherein the pre-fetcher 206 can then essentially act as a fetcher) the fetcher 204 can then act essentially as a pre-fetcher.

Still referring to FIG. 2A, pre-fetcher 208 operates (e.g., independently of fetcher 204, independently of pre-fetcher 206 and independently of renderer 202) to obtain information from the Internet (see communication path "F"). The information can be obtained from one or more servers. The information obtained by pre-fetcher 208 can include information such as, for example, stream metadata, initialization data, manifest data and/or DRM data (e.g., one or more licenses, one or more permissions). The information obtained by pre-fetcher 208 can be used to facilitate a quick channel change to yet another channel (that is, a channel that is different from both the one currently being rendered by renderer 202 and the one associated with the pre-fetching by pre-fetcher 206). The information obtained by pre-fetcher 208 can be sent (via a communication path not shown in this figure) to the renderer 202 upon a request by a user for the channel change to the channel associated with the information being obtained by the pre-fetcher 208. The information obtained by the pre-fetcher 208 can be associated with a channel that is determined (or predicted) as described herein. In another example, the pre-fetcher 208 can obtain information from a network other than (or in combination with) the Internet. After the channel change, the pre-fetcher 208 can act essentially as a fetcher. In one example, after the channel change (wherein the pre-fetcher 208 can then essentially act as a fetcher) the fetcher 204 can then act essentially as a pre-fetcher.

In various embodiments, certain communications between various elements of shown in FIG. 2A can be bi-directional (e.g., request/response).

As described herein, one or more embodiments provide for splitting a media player into a plurality of "pre-fetchers", a single "fetcher" and a single "renderer". In one example, a fetcher is a component which is connected to a network and which acquires stream metadata, DRM license/permission and media for a specific media stream. In another example, a pre-fetcher is a component which is connected to a network and acquires stream metadata and DRM license/permission (but, in this example, not media content) for a specific media stream. In one example, a given pre-fetcher component can be instantiated before intended play/playback of a particular stream and remain active after play/playback of the particular stream has ended (wherein the given pre-fetcher component is ready to be used again). In one example, there is a single pre-fetcher or fetcher for a given media asset. In one example, a renderer is a component which decrypts, decodes and displays the stream delivered and prepared by a given fetcher. In one example, a single renderer is used for rendering media across stream switches (that is, in this example, a single renderer is used for rendering media from a plurality of fetchers (one fetcher at a time)).

As described herein, in one or more embodiments a streaming media player architecture can enable considerably faster switching between media streams. In one example, the switches can be independent switches—such as between two different live channels, between two different video on demand (VOD) channels, or between a VOD channel and a live channel. In another example, the switches can be between main and secondary content (e.g. between a movie and ads).

In one example, all pre-fetchers are part of a first application, the fetcher is part of a different (second) application and the renderer is part of a still different (third) application. In another example, each pre-fetcher, the fetcher and the renderer are part of respective different applications. In another example, all pre-fetchers/fetcher are modules of an application and the renderer is a different module of the same application.

As described herein, each pre-fetcher can be operated in advance (without connection to a renderer) to pre-fetch information that will (or may be) needed in the future. The information that will (or may be) needed in the future can be determined via one or more predictions (e.g., based on "next" or "previous" channels in a list or as otherwise described herein).

In various examples, when switching back and forth between streams (channels) the fetcher(s)/pre-fetcher(s) do not need to re-collect information.

In various examples, when switching back and forth between streams (channels) the fetcher(s)/pre-fetcher(s) do not need to be torn down and re-instantiated.

In various examples, when switching back and forth between streams (channels) the renderer does not need to be torn down and re-instantiated.

In various examples, the fetcher/pre-fetchers can download media content and/or other information (e.g., metadata). In one specific example, a pre-fetcher can download metadata (and/or other information) of a particular stream while the particular stream is not being played (that is, in this example, download the metadata (and/or other information) without downloading the media content). In one example, the metadata (and/or other information), which can be periodically changing at the source server, can be periodically downloaded so that the downloaded metadata is always up to date. In one specific example, the metadata (and/or other information) can be downloaded only at a time that the corresponding media content is not being downloaded.

In one specific example, the renderer is instantiated once (during a given session) and is never torn down (removed from memory) during the given session (that is, in this example, the renderer does not go through instantiation-uninstantiation cycles").

In one specific example, each pre-fetcher keeps a state of a media stream up to date, so the information is ready when needed (such as a result of a channel change).

In one specific example, a single fetcher/renderer combination can be "active" (e.g., obtaining ancillary information as well as media content, such as segments of a media stream) while a plurality of pre-fetchers are passive (e.g., obtaining ancillary information but not obtaining media content).

In one specific example, each pre-fetcher can periodically (or constantly) obtain ancillary information that periodically (or constantly) changes for a live channel.

In one specific example, each pre-fetcher can obtain ancillary information from one or more servers. In one example, the ancillary information can include Media Presentation Description (MPD) data. Such MPD data can include a list of segments (each segment may be, for example, 6 seconds of media (video, audio).

In one specific example, there is one pre-fetcher per each of the x number (e.g., 10) of the most used channels. In one specific example, there is one pre-fetcher per each of the x number (e.g., 10) of the most recently used channels. In one specific example, there is one pre-fetcher per each of the channels that are predicted (as described herein).

Figure 2B:
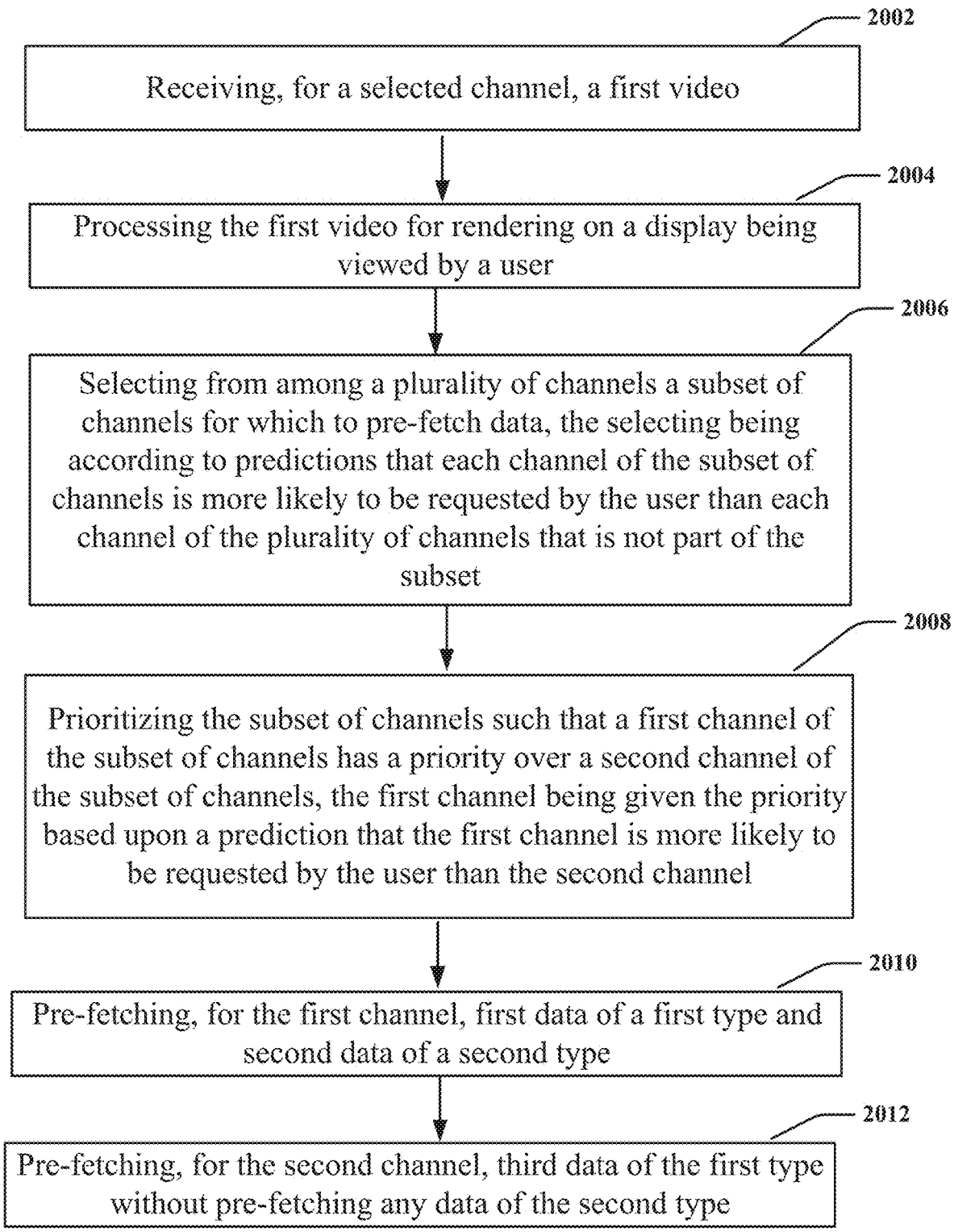
FIG. 2B depicts an illustrative embodiment of a method in accordance with various aspects described herein.

Referring now to FIG. 2B, various steps of a method 2000 according to an embodiment are shown. As seen in this FIG. 2B, step 2002 comprises receiving, for a selected channel, a first video. Next, step 2004 comprises processing the first video for rendering on a display being viewed by a user. Next, step 2006 comprises selecting from among a plurality of channels a subset of channels for which to pre-fetch data, the selecting being according to predictions that each channel of the subset of channels is more likely to be requested by the user than each channel of the plurality of channels that is not part of the subset. Next, step 2008 comprises prioritizing the subset of channels such that a first channel of the subset of channels has a priority over a second channel of the subset of channels, the first channel being given the priority based upon a prediction that the first channel is more likely to be requested by the user than the second channel. Next, step 2010 comprises pre-fetching, for the first channel, first data of a first type and second data of a second type. Next, step 2012 comprises pre-fetching, for the second channel, third data of the first type without pre-fetching any data of the second type.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2C:
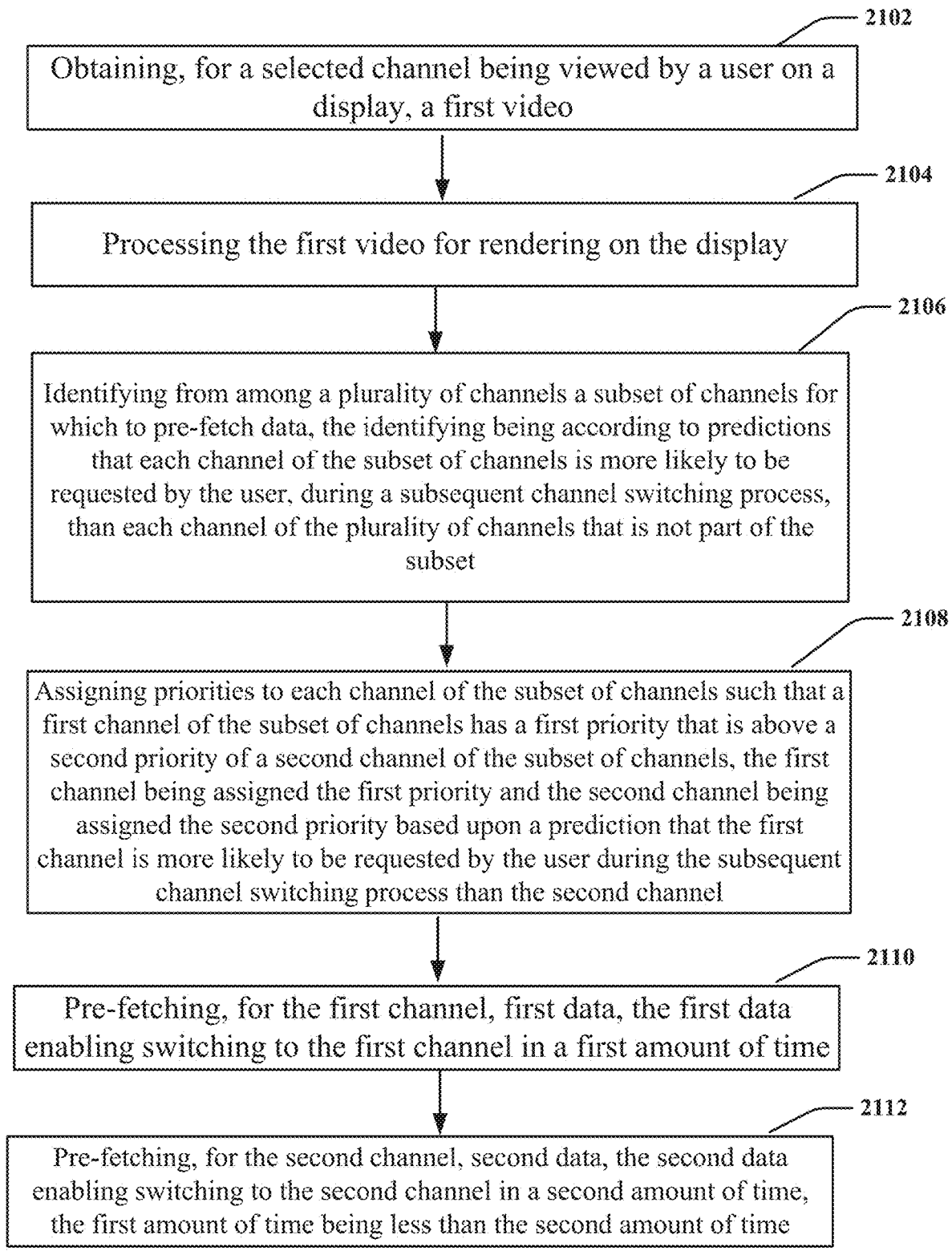
FIG. 2C depicts an illustrative embodiment of a method in accordance with various aspects described herein.

Referring now to FIG. 2C, various steps of a method 2100 according to an embodiment are shown. As seen in this FIG. 2C, step 2102 comprises obtaining, for a selected channel being viewed by a user on a display, a first video. Next, step 2104 comprises processing the first video for rendering on the display. Next, step 2106 comprises identifying from among a plurality of channels a subset of channels for which to pre-fetch data, the identifying being according to predictions that each channel of the subset of channels is more likely to be requested by the user, during a subsequent channel switching process, than each channel of the plurality of channels that is not part of the subset. Next, step 2108 comprises assigning priorities to each channel of the subset of channels such that a first channel of the subset of channels has a first priority that is above a second priority of a second channel of the subset of channels, the first channel being assigned the first priority and the second channel being assigned the second priority based upon a prediction that the first channel is more likely to be requested by the user during the subsequent channel switching process than the second channel. Next, step 2110 comprises pre-fetching, for the first channel, first data, the first data enabling switching to the first channel in a first amount of time. Next, step 2112 comprises pre-fetching, for the second channel, second data, the second data enabling switching to the second channel in a second amount of time, the first amount of time being less than the second amount of time.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2D:
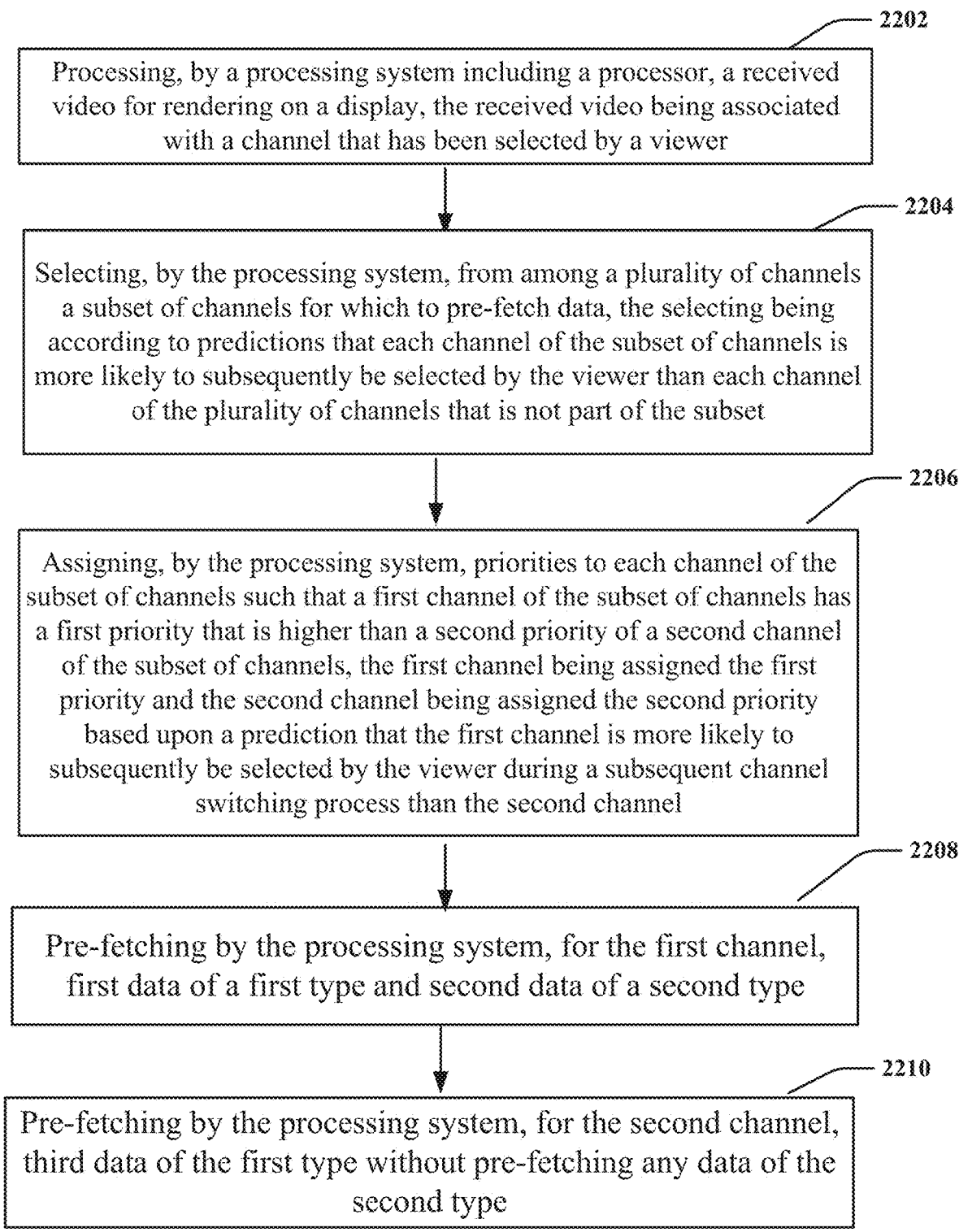
FIG. 2D depicts an illustrative embodiment of a method in accordance with various aspects described herein.

Referring now to FIG. 2D, various steps of a method 2200 according to an embodiment are shown. As seen in this FIG. 2D, step 2202 comprises processing, by a processing system including a processor, a received video for rendering on a display, the received video being associated with a channel that has been selected by a viewer. Next, step 2204 comprises selecting, by the processing system, from among a plurality of channels a subset of channels for which to pre-fetch data, the selecting being according to predictions that each channel of the subset of channels is more likely to subsequently be selected by the viewer than each channel of the plurality of channels that is not part of the subset. Next, step 2206 comprises assigning, by the processing system, priorities to each channel of the subset of channels such that a first channel of the subset of channels has a first priority that is higher than a second priority of a second channel of the subset of channels, the first channel being assigned the first priority and the second channel being assigned the second priority based upon a prediction that the first channel is more likely to subsequently be selected by the viewer during a subsequent channel switching process than the second channel. Next, step 2208 comprises pre-fetching by the processing system, for the first channel, first data of a first type and second data of a second type. Next, step 2210 comprises pre-fetching by the processing system, for the second channel, third data of the first type without pre-fetching any data of the second type.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In one or more embodiments, determinations of which information to fetch and/or pre-fetch (e.g., which information for which channels) can be based upon various preferences. These preferences can comprise, for example: (a) personal preferences (e.g., prior binging); (b) group preferences (e.g., trending topics where a certain TV show is being watched at a certain time); and/or (c) metadata (e.g., keywords, topics). In various examples, keywords and/or lists can be used in the determinations.

In one or more embodiments, determinations of which information to fetch and/or pre-fetch (e.g., which information for which channels) can be based upon one or more identities. In one example, the determinations can be based upon a context of a viewer (e.g., watching alone, watching with the viewer's children, viewing venue as public or private, or viewing location within a specific venue). In one specific example of venue/location, if a viewer is on a train, then a determination can be made to pre-fetch information for x number (e.g., 3) or less channels.

In one or more embodiments, determinations of which information to fetch and/or pre-fetch (e.g., which information for which channels) can be based upon personalization(s). In one example, the determinations can be based upon how a viewer is navigating with a given app on a given service. In one example, the determinations can be based upon engagement of a viewer (e.g., shallow, wide).

In one or more embodiments, determinations of which information to fetch and/or pre-fetch (e.g., which information for which channels) can be resource-based. In one example, the determinations can be based upon resource(s) specific to a device that is being used by a viewer (e.g., only pre-fetch content and/or data that will fit on the device that is being used by the viewer). In one example, the determinations can be based upon where the viewer is (and/or where the viewer is predicted to be) at a given time (e.g., based upon a schedule of the viewer).

In one or more embodiments, determinations of which information to fetch and/or pre-fetch (e.g., which information for which channels) can be based upon knowledge that is learned from actions (e.g., viewing habits) of other people who are unrelated to the particular user for which the determinations are being made.

In one or more embodiments, determinations of which information to fetch and/or pre-fetch (e.g., which information for which channels) can be based upon local attributes (e.g., associated with a device of a particular user for whom the determinations are being made) and/or global attributes (e.g., cloud information, information related to other viewers, etc.). In one example, the determinations can be based upon a merger and/or ranking of local and global attributes. In one example, the media playing device can provide some or all of the local information and the cloud (or the network) can provide some or all of the global information.

In one or more embodiments, determinations of which information to fetch and/or pre-fetch (e.g., which information for which channels) can be based upon historical data (e.g., associated with the particular user for whom the determinations are being made and/or associated with one or more "typical" viewers). In one example, a short term data point (or points) can be used to diverge (e.g., based upon current short term viewing habits) the pre-fetch information.

In one or more embodiments, determinations of which information to fetch and/or pre-fetch (e.g., which information for which channels) can be based upon a detection of a presence of multiple viewers in a room. In one example, a given viewer can be identified using, e.g., device MAC and/or facial recognition.

In one or more embodiments, determinations of which information to fetch and/or pre-fetch (e.g., which information for which channels) can be based upon a detection of a presence of multiple viewers in the same building (e.g., a house). In one example, if it is determined that multiple video streams are being sent (and/or have recently been sent) to a house at the same time, then a determination can be made that multiple people are in the house (and, possibly, in the same room). In one example, a determination of users being together in a room can be based upon detection of a network IP range associated with multiple media streams, concurrent use of a given user account, all users being logged into FACEBOOK (or other social media platform) at the same time. In one example, a pre-fetching prediction can be based upon a prediction of which user in a given group will "win-out". In one example, a pre-fetching prediction can be based upon users with similar interests.

In one or more embodiments, a group account can be set up. In one example, determinations of which information to fetch and/or pre-fetch (e.g., which information for which channels) can be based upon a group profile and/or characteristic(s) associated with the group account. In one example, user input can be provided indicating who the viewing group is and/or identifying each member of the group. In one example, the pre-fetched information (e.g., for multiple channels) can be split-up based on the group. In one example, a certain number of channels can be pre-fetched for each member of the group. In one specific example, if there are 4 members of a group and 8 pre-fetchers, then for each member of the group 2 associated channels will be pre-fetched.

In one or more embodiments, mechanisms are provided for different levels of pre-fetching (e.g., initialization data plus manifest vs. initialization data plus manifest plus digital rights management (DRM) data). In one example, the different levels of pre-fetching can be based upon different degrees of favorites/prediction.

In various embodiments, manifest data (e.g., which describes initialization data) can be pre-fetched and then the initialization data can be obtained (e.g., pre-fetched) based upon such manifest data. In one example, manifest data and initialization data can be obtained and the initialization data can be stored persistently (e.g., so that the stored initialization data is available for a given channel such as when the application/device is re-started or the user re-tunes to this channel without leaving the application). Since initialization data typically does not change often, keeping such initialization data persistently over long periods of time is possible. As described herein, an example operates in a manner of (in effect) re-using initialization data that was pre-fetched previously.

In one example, there can be three tiers: (a) "Tier 1" channels having highest likelihood of being requested by a viewer during a channel switching process; (b) "Tier 2" channels having a middle likelihood of being requested by a viewer during a channel switching process; and (c) "Tier 3" channels having lowest likelihood of being requested by a viewer during a channel switching process. In one example, the Tier 1 channels can have information pre-fetched which facilities the fastest switching (as compared to channels of Tiers 2 and 3). In another example, the Tier 2 channels can have information pre-fetched which facilities the switching at a speed below Tier 1 and above Tier 3. In another example, the Tier 3 channels can have information pre-fetched which facilities the slowest switching (as compared to channels of Tiers 1 and 2). In one example, the information that is pre-fetched for the Tier 1 channels can be initialization data, manifest data and DRM (digital rights management) data. In another example, the information that is pre-fetched for the Tier 2 channels can be only initialization data and manifest data. In another example, the information that is pre-fetched for the Tier 3 channels can be only initialization data. In one example, all available initialization data can be pre-fetched and/or the initialization data can be stored persistently. In one example, all available manifest data can be pre-fetched. In one example, the DRM data that is pre-fetched can be license and/or permission. In one example, the DRM data can be pre-fetched for a fewer number of channels than for the manifest data and/or than for the initialization data.

In one or more embodiments, content (such as media data) can be pre-fetched (e.g., video on demand (VOD) and/or broadcast).

In one or more embodiments, determinations of which information to fetch and/or pre-fetch (e.g., which information for which channels) can be based upon one or more specific features of a device that is being used by a viewer (e.g., don't pre-fetch a channel where a movie is starting at a mobile device that has limited battery).

In one or more embodiments, determinations of which information to fetch and/or pre-fetch (e.g., which information for which channels) can be implemented using artificial intelligence (AI). In one example, the AI can be used in the context of fetching and/or pre-fetching that is based upon preference, context and/or social identity. In one example, the AI can provide for one or more decisions that are divergent (e.g., if a viewer seems like they want to watch something different than they usually watch). In one example, the AI can use feedback. In various specific examples, the feedback used by the AI can be based upon: (a) a particular user (or viewer); (b) other users (or viewers) in the same household, (c) non-related users (or viewers)— e.g., the AI can perform statistical analysis of data associated with a large number of users (or viewers); the statistical analysis can relate to channels among which such large number of users (or viewers) tend to switch). In one example, the AI can determine (or predict) for which channels to pre-fetch information and/or when the information should be pre-fetched for one or more channels.

In one or more embodiments, a switching process to begin rendering video for a new channel (that is, a channel being switched to) can be performed within 100's of milliseconds (e.g., 400-500 milliseconds). In one example, such 100's of milliseconds start time can be based upon pre-fetching of metadata without pre-fetching of video content.

In one or more embodiments, determinations of channels for which information will be fetched and/or pre-fetched can be based upon a list of prior viewed channels.

In one or more embodiments, predictions of which channel(s) will next be requested by a viewer (or desired by a viewer) can be based upon history/preferences (e.g., based upon previous visits to various channels, the AI can cause pre-fetching of information for 10 channels). In one example, the predictions can be based upon thresholds and/or quantitative metrics (e.g., history of switching to channel X more than threshold T). In one example, the predictions can be based upon one or more factors that are outside of media consumption history (e.g., a purchase history at a sporting goods store increases the likelihood that a sporting channel will be watched). In one example, the predictions can be based upon other viewers that are detected in the viewing area (e.g., detected via presence information). In one specific example, the predictions can be based upon a group of college friends who are likely to switch to the college football game of their alma mater).

In one or more embodiments, information can be pre-fetched for a variable number of channels. In one example, the number of channels for which information is pre-fetched can vary based upon: (a) the particular user who is viewing; (b) the time of day/day of week (e.g., pre-fetch for more channels on Saturday afternoon as compared to Tuesday at 2:00 am); (c) the type of traffic (e.g., VOD vs. live); or (d) any combination thereof. In one example, since live traffic is resource intensive, information for a subset of users can be pre-fetched (as compared, for example, to VOD). In one example, the number of channels for which information is pre-fetched can be set based upon hardware limits/capabilities.

In one specific example, the channels for which information is pre-fetched can be carrying sports games, wherein the viewer is likely to desire to jump between such games. In one specific example, the channels for which information is pre-fetched can be the channels carrying the x number (e.g., 5) college basketball games being carried on a Saturday afternoon.

In one specific example, the channels for which information is pre-fetched can be the last x number (e.g., 10) channels visited. In one example, the channels for which information is pre-fetched do not need to be adjacent. In one example, the channels for which information is pre-fetched can be x number (e.g., 5-6) preset channels. In one example, the channels for which information is pre-fetched can be based upon history (e.g., profile of customer, based on customer viewing history). In one example, the channels for which information is pre-fetched can be predicted by AI and can comprise x number (e.g., 10) most likely channels that a viewer will want to watch on a given day (e.g., "today").

In one example, the channels for which information is pre-fetched can be determined upon startup, wherein the previous favorites are used and/or the previous most viewed x number (e.g., 5-6) of preset channels are used.

In one or more embodiments, determinations of which information to fetch and/or pre-fetch (e.g., which information for which channels) can be based upon: (a) user preselection of favorites (e.g., based on time periods); (b) system preselection; or (c) a combination of both.

In one or more embodiments, determinations of which information to fetch and/or pre-fetch (e.g., which information for which channels) can be based upon previously viewed channels. In one example, the determinations can indicate which channel(s) and which respective time(s).

As described herein, various embodiments can provide for fetching (and/or pre-fetching) of content and/or other information (e.g., metadata). In one example, content is stored on various servers and before the content can be rendered it is first fetched. In addition, a decision can be made as to which other channel(s) and/or information (e.g., metadata) are to be pre-fetched for possible future viewing (e.g., based upon permissions and/or other metrics). In one example, information can be pre-fetched for the last x number (e.g., 10) channels that a viewer has been watching. In another example, a determination of which information to pre-fetch can be based upon seasonal metrics (e.g., by specific data). In another example, a determination of which information to pre-fetch can be based upon favorites and/or user preferences.

As described herein, various embodiments can provide for machine-learning (ML) components and/or features. In one example, ML can facilitate ranking recommendations of which channels to go to next. In another example, ML can facilitate making predictions of which channels a user will want to go to next. The recommendations and/or predictions can be based upon, for example: (a) preferences such as: personal (viewership/genre, history, viewed parts of the series), group/aggregate (trending topics, location specialization, time of day/week seasonality), enticing metadata attributes (faces, keywords/topics); (b) identity such as: social (current co-located company, family, etc.); (c) personalization such as: contextual (novelty or uniqueness of asset where a user is binging or looking for something new), mood of content, engagement of user such as: changing channels a lot or just background noise; (d) resources such as: device (capacity left on device, bandwidth available now, battery left), location (expected time in this location).

Reference will now be made to a discussion of channel selection intelligence according to one or more embodiments. In one example, rendering and pre-fetching can be provided for near instant switching. In one example, mechanisms are provided to determine what channels should be pre-fetched and/or stored ahead of time.

In one example, predicting channels/artificial intelligence (AI) can allow pre-fetching at different levels (e.g., higher likelihood of channel discovery). In one specific example, AI can distinguish likelihood of future viewer desire with respect to pre-fetching (e.g., likelihood tiers).

In one example, pre-fetching can have different stages. In one specific example, the stages can comprise: (a) pre-fetch metadata—e.g., 100s of data (Live and/or VOD); pre-fetch manifest (in one example, this constantly changes (e.g., every 6 seconds); (c) pre-fetch DRM resources (e.g., more restrictive elements and allocation).

In one example, user interaction can be in the context of live channel pre-fetch of content (e.g., the ten last channels in this state will be preserved).

In one example, there can be different levels of pre-fetch. In one specific example, in a case in which there are a significant amount of suggestions, the pre-fetched information can be more static (e.g., initialization data). In another specific example, the pre-fetching mechanism can distinguish between on-demand and live content.

In one example, the AI can utilize a model that learns from itself (e.g., by monitoring previous channels). In one example, a continuous learning can be utilized. In one example, a reinforcement learning can be utilized (e.g., where reward is payoff on accuracy).

In one example, the AI can monitor immediate social information of the user(s). In one example, two sets of AI can be used. In one specific example, one AI is local (for the device and location characteristics) and one AI is remote (for preference and viewership).

In one example, divergent pre-fetch recommendations can be provided. In one specific example, such recommendations can be based upon behavior of the user's consumption and channel changing (via which you can determine that they want to find something that is totally different). In one specific example, one behavior can be using local cache (no hits in the 10 that were previously cached) and another behavior can be seeing that a viewer is watching things that are atypical for the user for that time of day (e.g., you usually watch news at this time, but now you're watching action movies). In another example, the AI can look at long tail of exposure or viewership (has the user ever been exposed to this content? is it related?).

Referring now to determining co-presence of the location according to various embodiments, some methods and solutions are as follows: (a) determine co-presence by cues from the application—are there multiple users logged into the account, are there multiple data streams going to this application; (b) other cues could be from other viewership analysis—seeing that a viewer had watched a certain channel to determine similar concepts; (c) yet other cues could be notifications that come back to the user e.g., "I see that you're watching a new video" or "I see that your video is related to the group watch X" and then "do you want to switch?"—if this switch is executed then it can restart the caching process.

Reference will now be made to a discussion of various model formulations according to various embodiments. One example of these formulations relates to recommendation/ profile learning as follows: the input is historical viewership or affinity towards a program; features can be derived directly from that program's descriptive metadata from an electronic programming guide (EPG) (e.g. keywords, actors, mood, genre, etc.); the model can be traditional learning platform (DNN, SVM, clustering, etc.); additionally, can compute seasonality of recommendation as regression model (e.g., viewer watches program X at this time of day); the output is recommendation of that program being interesting (such output can be used in the various pre-fetching methodologies described herein).

Another example of the above-mentioned formulations relates to identity and social determination as follows: the input is from physical indicator (e.g., co-located phones from peer-level BLUETOOTH®, detected face from forward camera, detected other device on network (e.g. in-home LAN); features are co-occurrence of physical indicator and content; the model can be traditional learning method (DNN, SVM, clustering) and/or those with social graph analysis (for co-presence and affinity to a common feature); the output is recommendation of content (such output can be used in the various pre-fetching methodologies described herein).

Another example of the above-mentioned formulations relates to personalization as follows: the input is behavioral viewing or application usage—has the user changed channels a lot or are they watching a program that is different from what they normally watch at this time; features are what the channel change rate is, how different is the content from what is typical, other seasonal inputs, time of day, etc.; model method can be GAN-based (a Generative Adversarial Network, because it is adversarially trying to recommend things that are out of context and yet very specific) but still providing a classification of relevant or not; output is recommendation of content (such output can be used in the various pre-fetching methodologies described herein).

Another example of the above-mentioned formulations relates to resource estimation as follows: the input is device and local information that is specific to consumption platform; features are resource availability, time in location, bandwidth capability, etc.; model is traditional model; output recommendation either for a specific program or a specific type of program (e.g. duration of program, bit-rate complexity of the program/channel). Such output can be used in the various pre-fetching methodologies described herein.

Another example of the above-mentioned formulations relates to overall model architecture as follows: DNNs are performant for most models and in one embodiment, local features are run with local model and then others are run at network/edge and pooled locally.

Another example of the above-mentioned formulations relates to overall ranking model as follows: DNN regression can be used for this type of model that will take the outputs of other recommendations and pool/rank them for optimal ranking/recommendation.

In another example, if it is determined that a viewer is watching with a group, then a switch could be made to a profile associated with that group.

In various embodiments, any desired process (or processes) can be performed using artificial intelligence, machine learning or any combination thereof.

In various embodiments, any desired process (or processes) can be performed dynamically, programmatically or any combination thereof.

Referring now to FIG. 3, a block diagram 300 is shown illustrating an example, non-limiting embodiment of a virtualized communication network in accordance with various aspects described herein. In particular, a virtualized communication network is presented that can be used to implement some or all of the subsystems and functions of communication network 100, the subsystems and functions of system 200, and methods 2000, 2100, 2200 presented in FIGS. 1, 2A, 2B, 2C, 2D and 3. For example, virtualized communication network 300 can facilitate in whole or in part determining (or predicting): (a) for which channels to pre-fetch information; and/or (b) when the information should be pre-fetched for one or more channels. Further, virtualized communication network 300 can facilitate in whole or in part pre-fetching of such information.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
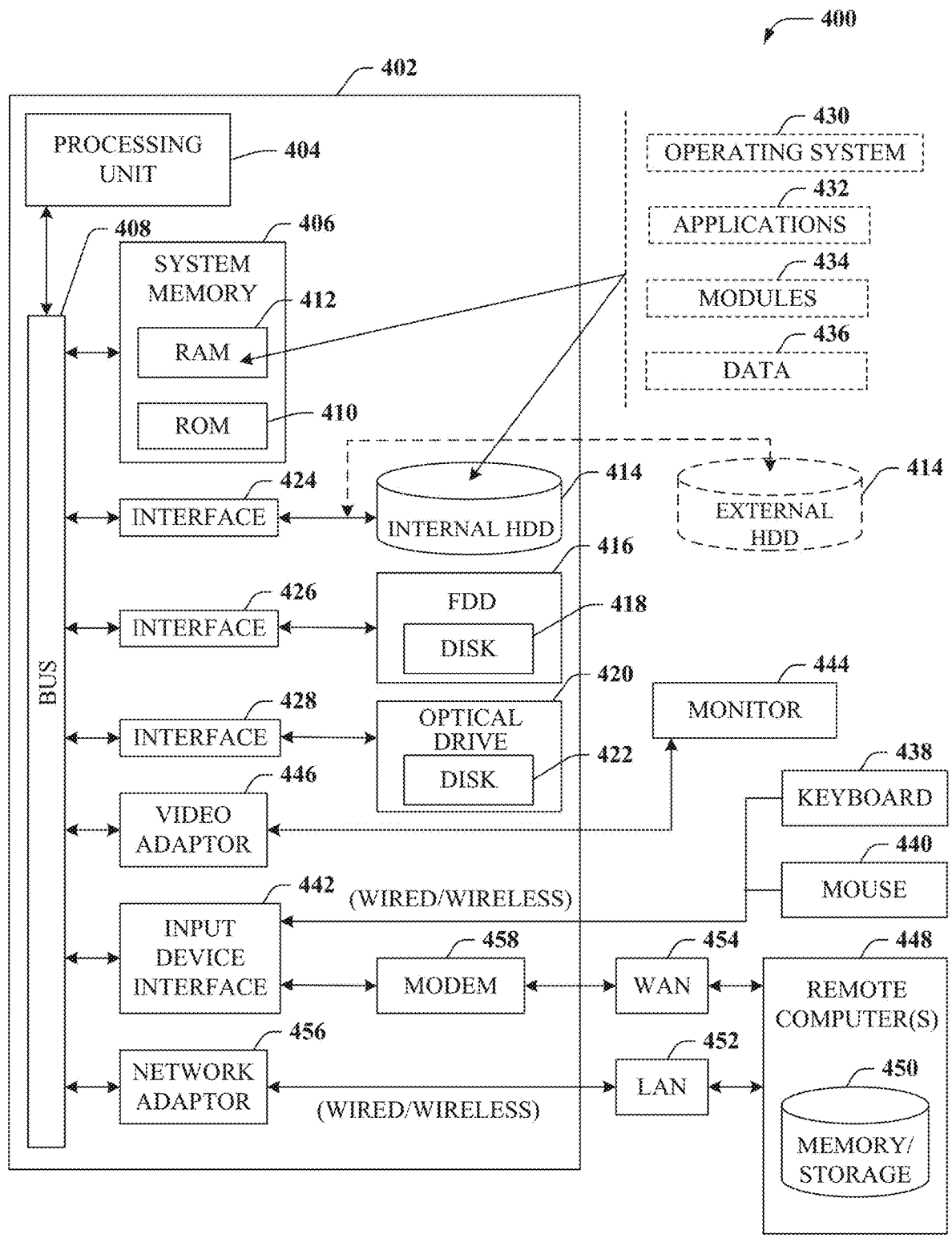
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part determining (or predicting): (a) for which channels to pre-fetch information; and/or (b) when the information should be pre-fetched for one or more channels. Further, computing environment 400 can facilitate in whole or in part pre-fetching of such information.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
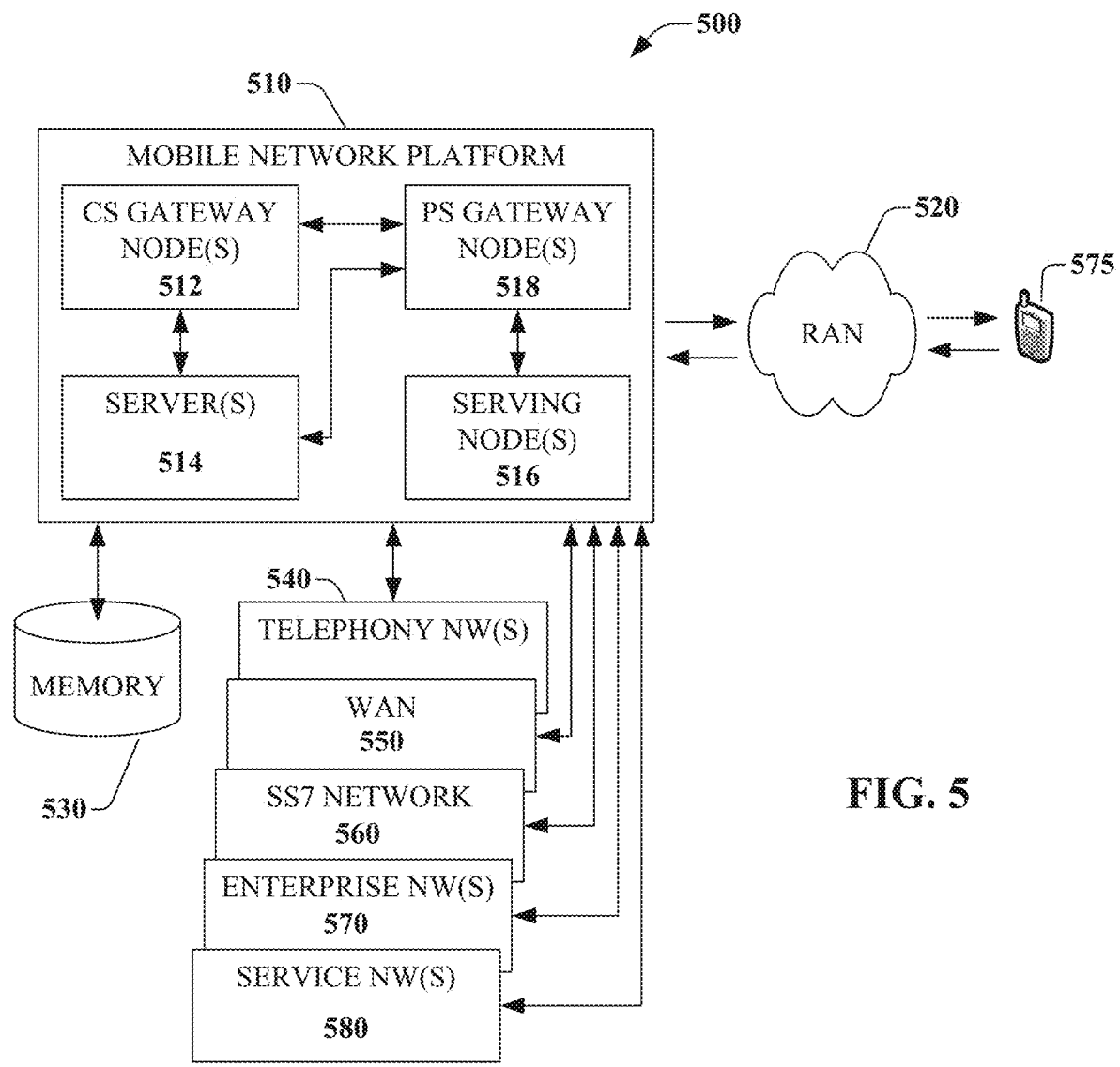
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part determining (or predicting): (a) for which channels to pre-fetch information; and/or (b) when the information should be pre-fetched for one or more channels. Further, platform 510 can facilitate in whole or in part pre-fetching of such information. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
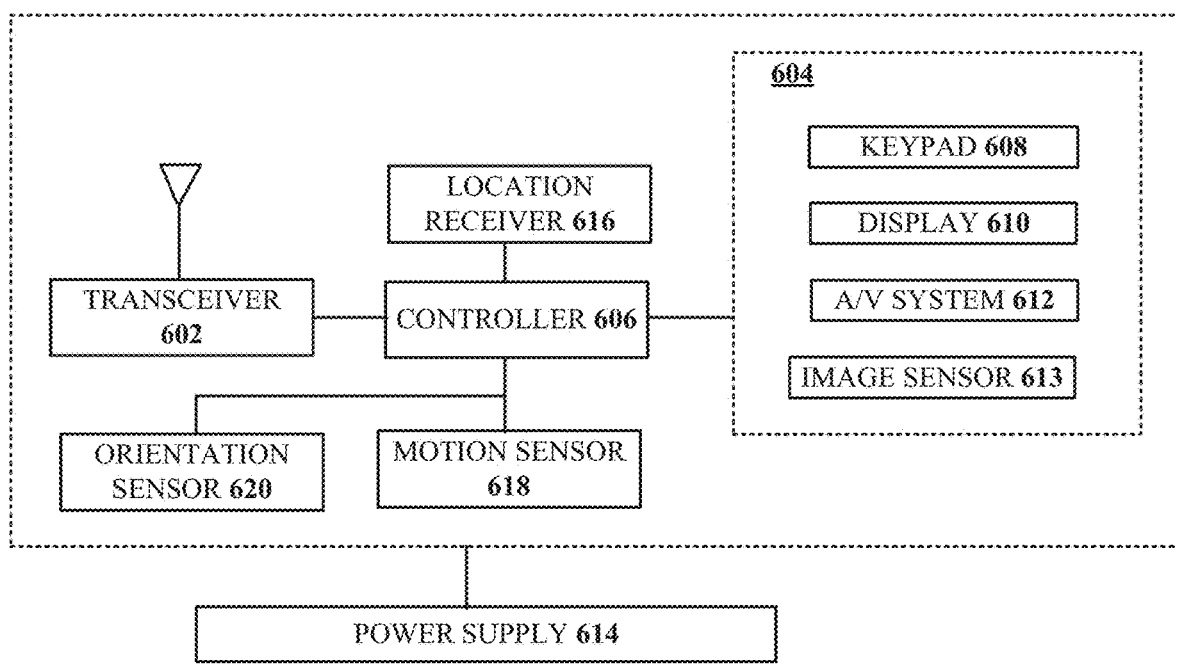
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part determining (or predicting): (a) for which channels to pre-fetch information; and/or (b) when the information should be pre-fetched for one or more channels. Further, computing device 600 can facilitate in whole or in part pre-fetching of such information. The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as BLUETOOTH®, ZigBee®, Wi-Fi, DECT, or cellular communication technologies, just to mention a few (BLUETOOTH® and ZigBee® are trademarks registered by the BLUETOOTH® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example BLUETOOTH®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, BLUETOOTH®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying channels for which information is to be pre-fetched) can employ various AI-based schemes for carrying out various embodiments thereof. Moreover, a classifier can be employed to determine a ranking or priority associated with the pre-fetching. A classifier is a function that maps an input attribute vector, x=(x1, x2, x3, x4, xn), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device comprising:
    a processing system including a processor; and
    a memory that stores executable instructions that, when executed by the processing system, facilitate performance of operations, the operations comprising:
    selecting from among a plurality of channels a subset of channels for which to pre-fetch data, the selecting being according to predictions that each channel of the subset of channels is more likely to be requested by a user who is viewing a first video than each channel of the plurality of channels that is not part of the subset;
    prioritizing the subset of channels such that a first channel of the subset of channels has a priority over a second channel of the subset of channels, the first channel being given the priority based upon a prediction that the first channel is more likely to be requested by the user than the second channel;
    pre-fetching, for the first channel, first data of a first type and second data of a second type, the first data of the first type being manifest data; and
    pre-fetching, for the second channel, third data of the first type without pre-fetching any data of the second type.

2. The device of claim 1, wherein the operations further comprise:
    receiving, for a selected channel, the first video;
    receiving an instruction from the user to change from the selected channel to the first channel; and
    responsive to the instruction:
        receiving for the first channel a second video; and
        processing the second video for rendering on a display instead of the first video, the processing of the second video utilizing the first data of the first type and the second data of the second type.

3. The device of claim 1, wherein the operations further comprise:
    receiving, for a selected channel, the first video;
    receiving an instruction from the user to change from the selected channel to the second channel; and
    responsive to the instruction:
        receiving for the second channel a second video; and
        processing the second video for rendering on a display instead of the first video, the processing of the second video utilizing the third data of the first type without utilizing any data of the second type.

4. The device of claim 1, wherein the selecting, the prioritizing, or a combination thereof is performed using artificial intelligence, machine learning, or a combination thereof.

5. The device of claim 1, wherein:
    the second data of the second type is DRM (digital rights management) data.

6. The device of claim 1, wherein:
    the manifest data is used in conjunction with initialization data.

7. The device of claim 1, wherein the operations further comprise pre-fetching first video data corresponding to the first channel, pre-fetching second video data corresponding to the second channel, or a combination thereof.

8. The device of claim 1, wherein:
    the operations further comprise processing the first video for rendering on a display being viewed by the user;
    the processing of the first video for rendering on the display is performed by a first portion of the processing system;
    the pre-fetching, for the first channel, is performed by a second portion of the processing system, the second portion being distinct from the first portion;
    the first portion comprising one of first hardware, first firmware, first software, or a combination thereof; and
    the second portion comprising one of second hardware, second firmware, second software, or a combination thereof.

9. The device of claim 8, wherein:
    the pre-fetching, for the second channel, is performed by a third portion of the processing system, the third portion being distinct from the first portion and being distinct from the second portion; and
    the third portion comprising one of third hardware, third firmware, third software, or a combination thereof.

10. A non-transitory machine-readable medium comprising executable instructions that, when executed by a processing system including a processor, facilitate performance of operations, the operations comprising:
    identifying from among a plurality of channels a subset of channels for which to pre-fetch data, the identifying being according to predictions that each channel of the subset of channels is more likely to be requested by a user who is viewing a first video, during a subsequent channel switching process, than each channel of the plurality of channels that is not part of the subset;

assigning a respective priority to each channel of the subset of channels such that a first channel of the subset of channels has a first priority that is above a second priority of a second channel of the subset of channels, the first channel being assigned the first priority and the second channel being assigned the second priority based upon a prediction that the first channel is more likely to be requested by the user during the subsequent channel switching process than the second channel;

pre-fetching, for the first channel, first data of a first type and second data of a second type, the first data of the first type being manifest data; and pre-fetching, for the second channel, third data of the first type without pre-fetching any data of the second type.

11. The non-transitory machine-readable medium of claim 10, wherein:
the switching to the first channel comprises processing a second video for rendering on a display; and
the switching to the second channel comprises processing a third video for rendering on the display.

12. The non-transitory machine-readable medium of claim 11, wherein:
the first data includes initialization data.

13. The non-transitory machine-readable medium of claim 10, wherein:
the executable instructions comprise a first set of executable instructions and a second set of executable instructions;
the first set of executable instructions is distinct from the second set of executable instructions;
the identifying and the assigning are performed by the first set of executable instructions; and
the pre-fetching, for the first channel, is performed by the second set of executable instructions.

14. The non-transitory machine-readable medium of claim 13, wherein:
the executable instructions further comprise a third set of executable instructions;
the third set of executable instructions is distinct from the first set of executable instructions;
the third set of executable instructions is distinct from the second set of executable instructions; and
the pre-fetching, for the second channel, is performed by the third set of executable instructions.

15. A method, comprising:
selecting, by a processing system including a processor, from among a plurality of channels a subset of channels for which to pre-fetch data, the selecting being according to predictions that each channel of the subset of channels is more likely to subsequently be selected by a viewer than each channel of the plurality of channels that is not part of the subset;

assigning, by the processing system, a respective priority to each channel of the subset of channels such that a first channel of the subset of channels has a first priority that is higher than a second priority of a second channel of the subset of channels, the first channel being assigned the first priority and the second channel being assigned the second priority based upon a prediction that the first channel is more likely to subsequently be selected by the viewer during a subsequent channel switching process than the second channel;

pre-fetching by the processing system, for the first channel, first data of a first type and second data of a second type, the first data of the first type being manifest data; and pre-fetching by the processing system, for the second channel, third data of the first type without pre-fetching any data of the second type.

16. The method of claim 15, wherein the second data of the second type is DRM (digital rights management) data.

17. The method of claim 15, wherein:
the selecting, the assigning, or a combination thereof is performed dynamically, programmatically, or a combination thereof.

18. The method of claim 15, further comprising:
performing, by the processing system, the subsequent channel switching process;
wherein the subsequent channel switching process comprises switching to the first channel; and
wherein the performing the subsequent channel switching process utilizes the first data of the first type and the second data of the second type.

19. The method of claim 15, further comprising:
performing, by the processing system, the subsequent channel switching process;
wherein the subsequent channel switching process comprises switching to the second channel; and
wherein the performing the subsequent channel switching process utilizes the third data of the first type without utilizing any data of the second type.

20. The method of claim 15, wherein the manifest data is used in conjunction with initialization data.

* * * * *